(12) United States Patent
Zoppas et al.

(10) Patent No.: US 7,025,193 B2
(45) Date of Patent: Apr. 11, 2006

(54) DEVICE AND METHOD FOR PICKING UP, HANDLING AND MOVING OBJECTS

(75) Inventors: Matteo Zoppas, Fontanafredda (IT); Marco Leonardi, Treviso (IT); Andrea Saran, Monastier (IT); Alberto Armellin, Vittorio Veneto (IT); Paola Tamagnone, Conegliano (IT)

(73) Assignee: SIPA Societa Industrializzazione ProgettazioneAutomazione S.p.A.,, Vittorio, Veneto (IT)

( * ) Notice: Subject to any disclaimer, the term of this patent is extended or adjusted under 35 U.S.C. 154(b) by 30 days.

(21) Appl. No.: 10/469,022

(22) PCT Filed: Feb. 25, 2002

(86) PCT No.: PCT/EP02/01949

§ 371 (c)(1),
(2), (4) Date: Mar. 4, 2004

(87) PCT Pub. No.: WO02/068300

PCT Pub. Date: Sep. 6, 2002

(65) Prior Publication Data

US 2004/0134761 A1 Jul. 15, 2004

(30) Foreign Application Priority Data

Feb. 26, 2001 (IT) .......................... MI2001A0387

(51) Int. Cl.
B65G 47/24 (2006.01)
(52) U.S. Cl. .............................. 198/377.03; 198/803.12

(58) Field of Classification Search ............. 198/803.8, 198/803.12, 379, 377.03, 377.07; 294/99.1
See application file for complete search history.

(56) References Cited

U.S. PATENT DOCUMENTS

| 3,945,486 | A | | 3/1976 | Cooper |
| 4,082,175 | A | * | 4/1978 | Gibbemeyer ........... 198/377.02 |
| 4,086,999 | A | | 5/1978 | McDonald |
| 4,572,355 | A | * | 2/1986 | Hunter ................... 198/803.12 |
| 5,769,476 | A | | 6/1998 | Lawn et al. .......... 198/803.8 X |

FOREIGN PATENT DOCUMENTS

DE 3908345 C1 1/1991

* cited by examiner

Primary Examiner—James R. Bidwell
(74) Attorney, Agent, or Firm—Simpson & Simpson, PLLC

(57) ABSTRACT

A device (1) for conveying objects (2) having at least one open end (200) (for example plastic bottles and corresponding semi-finished products throughout their production process), including a picking-up and withholding apparatus (20) suitable for gripping and withholding the object from inside the open end (200), and further including a protective sliding sleeve (7, 70) suitable for covering and protecting a predetermined portion of the object (2) in the proximity of the open end (200) is characterised in that the actuation for picking up or releasing the object (2) by the picking-up and withholding apparatus (20) is independent of the movements of sliding of the sleeve (7, 70), which can be raised or lowered, the object (2) at the same time continuing to be firmly gripped. Device (1) is suitable to be used on a chain conveyor. A method for using device (1) is also provided.

19 Claims, 7 Drawing Sheets

DEVICE AND METHOD FOR PICKING UP, HANDLING AND MOVING OBJECTS

FIELD OF THE INVENTION

The present invention relates to a device, so-called chuck, and to a method for picking up, handling and moving objects and, more particularly, for picking up, handling and moving moulded products, such as bottles made of plastic material, within a production plant.

BACKGROUND OF THE INVENTION

For the production of a wide range of objects, amongst which containers made of plastic materials, such as bottles or jars for foodstuffs made of PET, PP, HDPE, PEN (or other composite polymers, for example blends, multi-layers, etc.), various devices have been developed for fixing the semi-finished products in the blow-moulding stage to systems such as overhead conveyors, chain conveyors and the like (or else systems generically referred to as "endless load-conveying surface conveyors"), and for carrying them through the various workstations downstream of the blow-moulding station (for example, stations for thermal treatment, coating, or other forms of treatment).

In certain situations, the gripping of the moulded object during the operations of loading or unloading of the conveyor may prove particularly delicate, since the moulded object may be particularly subject to damage, for example, when the material of a blow-moulded bottle is not yet perfectly cross-linked, or a coating or paint is not yet cross-linked or hardened.

Moreover, in several known coating processes, the blown bottles or other objects to be coated are spinned to a relatively high rate while conveyed through a coating spray tunnel in order to achieve a uniform distribution of the spray on the bottle surface, and/or are conveyed at high velocity in high capacity production chains. Hence it's generally desired to have devices which can fasten the bottles, or other objects to be coated, to an overhead conveyer, firmly and securely holding them in spite of high spin rates or conveying velocity.

At the same time, in certain cases it may be necessary to protect the chuck and/or some parts of the moulded object from certain forms of treatment, for instance, to exclude some areas from a coating treatment and protect them.

SUMMARY OF THE INVENTION

One of the purposes that the present invention seeks to achieve is to provide an improved device and a method for picking up, handling and moving objects having at least one open end, using a conveyor, reducing any possible damage to the conveyed objects themselves during the operations of loading/unloading of the conveyor, under critical conditions, such as those encountered immediately downstream of a coating stage and even in combination with high speeds of the conveyor.

Another purpose of the present invention is to provide an improved device and a method for picking up, handling and moving, by means of a conveyor, objects having at least one open end, protecting a pre-determined area in the vicinity of the point where the objects are picked up from possible aggressive environments during the conveying operation.

The above purposes are achieved by means of a device for conveying objects having, in accordance with claim 1, at least one open end, comprising picking-up means suitable to grip and withhold the object from inside the open end, and comprising in addition a protective sliding sleeve suitable to cover and protect a pre-determined portion of the object in the proximity of the open end, characterised in that the actuation for picking up or releasing the object by the picking-up and withholding means is independent of the movements of sliding of the sleeve.

The above purposes are also achieved with a method for handling and moving objects having at least one open end, comprising the following operations:

gripping and withholding the object from inside the open end with picking-up means which further comprise a protective sliding sleeve suitable to cover and protect a pre-determined portion of the object in the proximity of the open end, where said picking-up means is conveyed by an endless traction element conveyor or endless load conveying surface conveyor;

moving the object withheld by the picking-up means through a pre-determined succession of processing stations, protecting the pre-determined portion of the object in the proximity of the open end by covering it with the sliding sleeve;

uncovering the pre-determined portion of the object in the proximity of the open end, maintaining the grip on the object from inside the open end using the picking-up means; and removing the object from the picking-up means by other picking-up means external to the picking-up means.

It is also a purpose of the present invention to provide an improved device for picking-up, handling and moving, by means of a conveyor, objects having at least one open end, holding and spinning them at relatively high spin rates and/or conveying them at high velocity.

These purposes, according to another aspect of the present invention, are achieved by a device having the features according to claims 5 and 6.

Some preferred features of the invention, which form the object of the dependent claims, constitute an improvement in terms of weight, impact on total costs of the production plant, smaller number of components, and reduced maintenance requirements, also in the case of picking-up and conveying devices that are also required to enable rotation of the semi-finished product at relatively high speeds during conveyance.

Other preferred embodiments ensure a precise grip on the moulded object, thus contributing to the reduction of vibrations in the system during rotation and advancing of the object at high speed.

Some preferred embodiments enable fast replacement of worn-out parts, using fast-action coupling systems.

The picking-up device with a radially expandable ring of elastic or resilient extensions or fingers provides a simple and cheap holding device which can work at high spin rates and at high conveying velocity; the friction gripping force of the holding device on the object can be improved by using proper technopolymers such as polyvinylidene fluoride.

The ring of elastic or resilient extensions or fingers can be produced by plastic injection moulding and allows a substantial cost reduction with respect to, e.g., chucks or holding devices with the gripping part made of metal.

The chuck has thus a simple construction and can be produced at quite low assembly and manufacturing costs.

Preferred features of the invention are further disclosed in depending claims.

BRIEF DESCRIPTION OF THE DRAWINGS

Further advantages that may be achieved by means of the present invention will emerge more clearly, to a person skilled in the art, from the ensuing detailed description of two preferred, non-limiting, examples of embodiment, with reference to the attached figures, in which.

DETAILED DESCRIPTION OF THE PREFERRED EMBODIMENT

Figure 1:
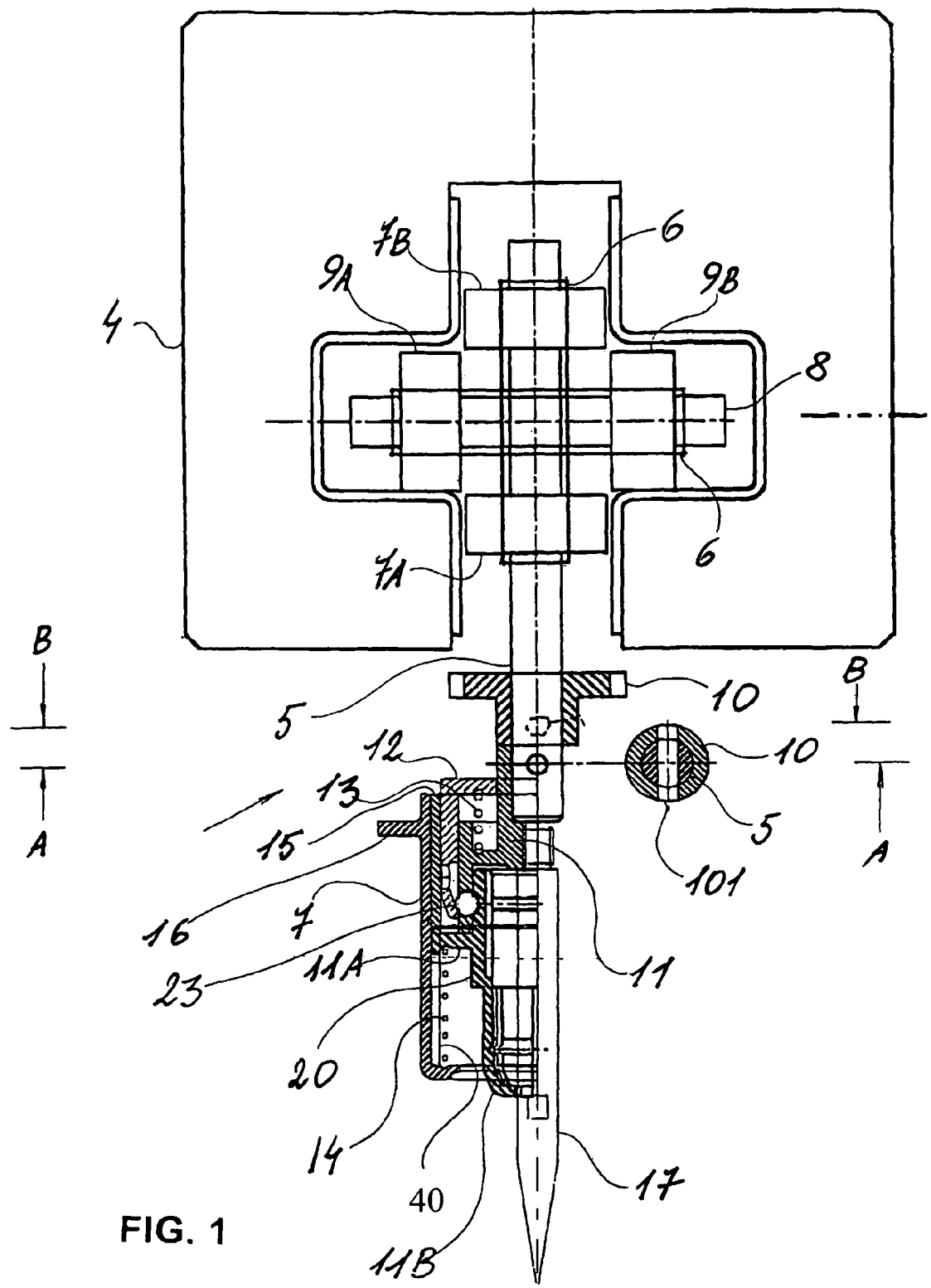
FIG. 1 is a schematic cross-sectional view according to a vertical plane of a device for picking up, handling and moving containers having at least one open end, according to a first embodiment of the present invention.

FIG. 1 is a schematic cross-sectional view according to a vertical plane of a device for picking up, handling and moving containers having at least one open end, according to a first preferred embodiment of the present invention. In the particular example described herein, the device is used for picking up and handling blow-moulded bottles made of PET or PP. In the description hereinafter reference will be made indifferently to containers, bottles or objects to indicate the same objects on which the device according to the invention can be utilised.

The device for picking up, handling and moving objects which forms the subject of the present invention is designated, as a whole, by the reference number 1, and is suitable to fix an object 2 or, more particularly, a container 2, hereinafter referred to also as "bottle 2" see FIGS. 3a and 3b, to a conveyor 3 of the type known as "endless traction element" or an overhead chain conveyor. Without departing from the scope of the present invention, the conveyor to which one or more picking-up devices 1 are to be applied may be a rope-and-button conveyor, a belt conveyor, a carriage conveyor, a platform conveyor, a slat conveyor, or an apron conveyor, and may also be a conveyor that stands on the floor or is located below floor level, or any other appropriate type of conveyor, to which the picking-up device 1, instead of hanging, may be fixed underneath after being rotated through 180° with respect to the position illustrated in FIG. 1. In the following description and in the claims, the conveyor, designated by the reference number 3, is generically a conveyor of any one of the aforementioned types.

The device for picking up, handling and moving objects illustrated in FIG. 1 comprises a rail or supporting guide made of section bar 4 obtained in general by bending, and, only in certain portions of the conveyor, by extrusion in order to ensure a higher stiffness and precision of positioning, as will be explained in greater detail in what follows. The device of FIG. 1 is used in a plant (not shown) for the moulding and treatment of plastic bottles in order to convey the bottles from the blow-moulding unit to the stations downstream thereof, for example the coating or spray-coating stations, and from here to a possible drying oven, heat-treatment station, and/or a station for stacking or unloading the finished products.

The device 1 for picking up, handling and moving objects shown in FIG. 1 comprises a vertical shaft 5 inserted in a housing 6, on which there rotate, coaxially to the shaft 5, two rolling wheels (or bearings) 7a, 7b with vertical axis. Integral with the housing 6 is a horizontal shaft 8 on which there rotate two wheels (or bearings) 9a, 9b with horizontal axis. The shaft 5 can be fixed to a conveyor 3 in a wide range of ways; for example, it can be fixed in the middle of a chain element of a conveyor 3, at some distance from the wheels 7a, 7b, 9a, and 9b. The conveyor 3 can be of the type with just wheels with horizontal axis 9a, 9b or any other known conveyor of a suitable kind.

Figure 1B:
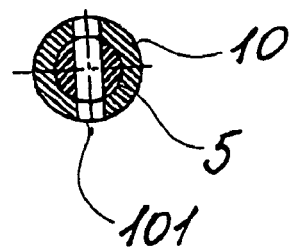
FIG. 1b is a schematic cross-sectional view of the device of FIG. 1 according to a plane A—A, and also coincides with a cross section according to a plane B—B.

In the example of FIG. 1, the vertical shaft 5, supported by anti-friction bushings, can turn about its own longitudinal axis with respect to the housing 6 and to the section bar 4, and can receive a rotational torque by means of the pinion gear 10 that is coaxial to it—for example the pinion gear 10 can be fixed on the shaft 5, either with an interference fit, or else with a slot-and-dowel, with an elastic pin 101 (see FIG. 1b) or a taper pin.

As is known from the prior art, the pinion gear can be set in rotation, for example by a second drive chain which slides in the opposite direction to that of advance of the conveyor 3. Alternatively, once more according to the prior art, it is possible to replace the drive chain+pinion gear system 10 for example with a V-belt+pulley system, or else a plane belt+friction wheel system.

According to an aspect of the present invention, the device 1 for picking up, handling and moving objects comprises picking-up means, usually called chuck, 20 suitable to grip and withhold the container 2 from inside the open end 200 (in the example shown, the picking-up means grip the bottle 2 from inside its neck 200—FIG. 3), and further comprises a protective sliding sleeve 7 suitable to cover and protect a predetermined portion of the object or container in the proximity of the open end 200 of the container 2, and is characterised in that the actuation for picking up or releasing the object 2 by the picking-up and withholding means 20 is independent of the movements of sliding of the sleeve 7 with respect to the ensemble of the device 1 for picking up, handling and moving objects. In fact, in the example illustrated, on the vertical shaft 5 and coaxially to it there is fixed—for example with one of the aforementioned systems for fixing the pinion gear 10 to the shaft 5—an intermediate element 11, on which the picking-up means 20 are fixed and blocked both axially and in such a way as to prevent rotation by means of a ball-type press-block coupling (described in greater detail in what follows). Made of a single piece with the picking-up means 20 is also a flange 11A having a slotted outer edge 11C which is complementary to the internal slotted section 40 of the sliding sleeve 7, with which it engages in such a way that it can slide therein longitudinally, transmitting driving torque parallel to the axis of rotation of the shaft 5—the slotted coupling can be replaced by other modes of connection that enable vertical sliding with the transmission of a torque—. That is, the slotted external edge 11C constitutes a slide guide, on which the sleeve 7 slides. The picking-up means 20 in the preferred embodiment of FIG. 1 consists of a radially expandable ring of elastic, or anyway deformable, fingers, extensions or prolongation 11B—made preferably of an injectable technopolymer with sufficient wear resistance, and resistance to temperature and chemical agents—, which rest, in a position corresponding to an internal groove (FIG. 1a), on an annular spring 21 set inside the aforesaid ring and positioned roughly perpendicular to the longitudinal axis of the ring. The annular spring 21 enables the ring of elastic prolongations 11B to expand or contract with an easily controllable radial elasticity (chiefly dependent upon the elastic characteristics of the wire of the spring and of its positioning along the axis of the ring), and enables solution of the problems of fatigue failure which elastic elements made of plastic material presented in the past.

The thickness and shape of the elastic prolongations are adapted to the container that is to be conveyed, in order to support it more or less rigidly according to the process specifications (for example, speed, angular velocity, format of the container or preform, weight of the container or preform, design of the thread, temperature, etc.).

Advantageously the injectable polymer, of which the ring of the elastic prolongations 11B is made of, is polyvinylidene fluoride (PVDF) or another fluorine polymer or copolymer; the use of PVDF in carrying out the chuck 20 provides good friction forces with the bottleneck to be grasped; as further advantages, in this applications PVDF provides a good resistance to relatively high temperatures, around 100° to 120° C. and wear, or erosion, resistance.

With this kind of picking-up means 20 it's possible to hold a bottle even with relatively high spinning rates, e.g. of up to 1100 rpm, or more, as better described hereinafter.

As it will become apparent from the description of another embodiment—shown in FIG. 6 and better described later—of a device according to the present invention, the chuck 20 can be used also in devices for picking up, handling and moving containers without a protective sliding sleeve 7, for applications where no particular protection is needed.

Figure 1A:
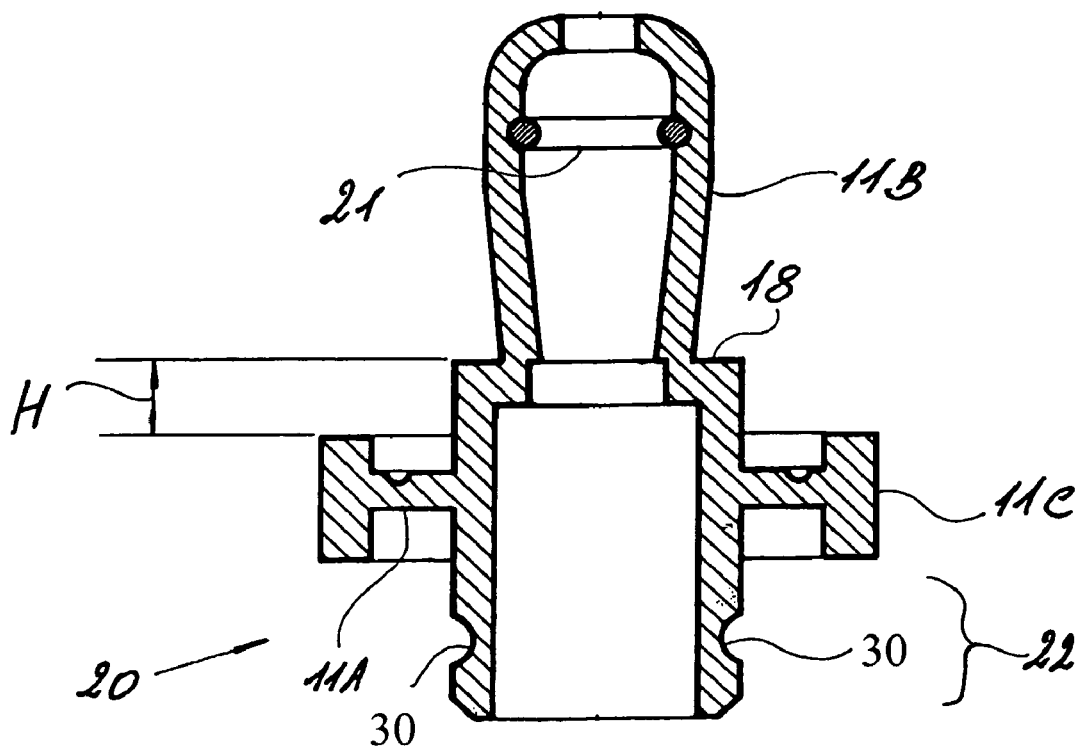
FIG. 1a is a schematic longitudinal cross-sectional view of the picking-up means of the device of FIG. 1.
Figure 2E:
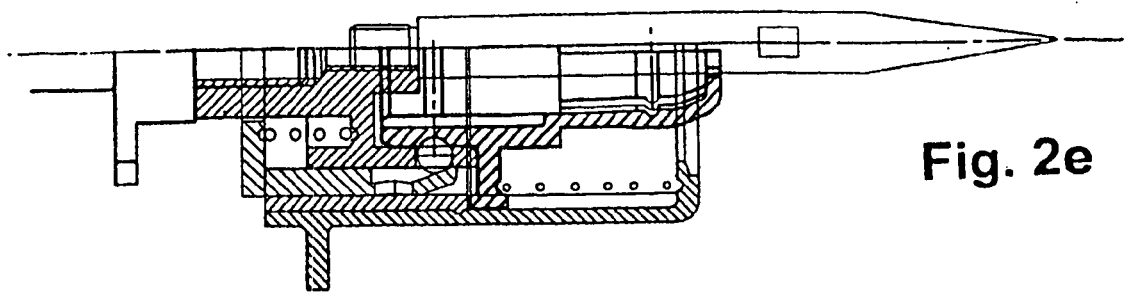
FIGS. 2a–2e are longitudinal cross-sectional views of the sequence of fast-coupling insertion of the embodiment of FIG. 1.
Figure 2D:
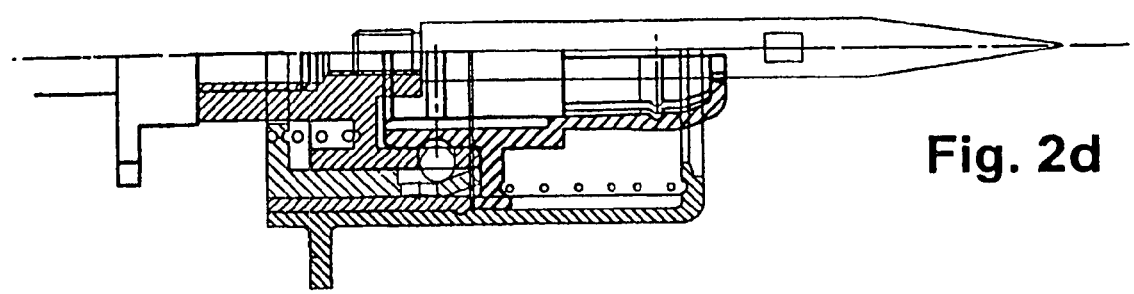
Figure 2C:
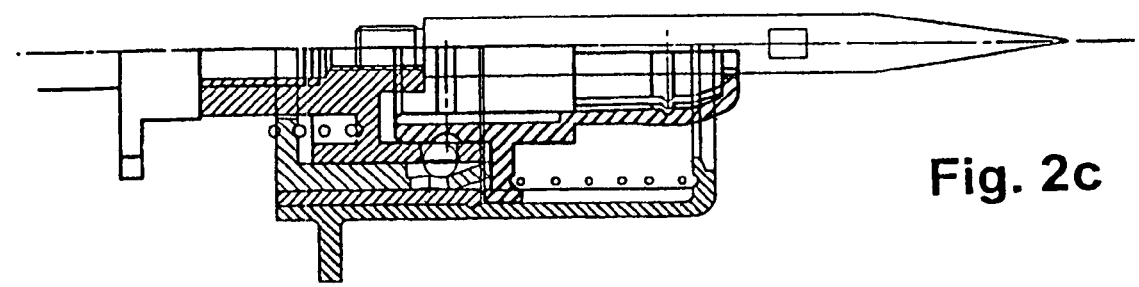
Figure 2B:
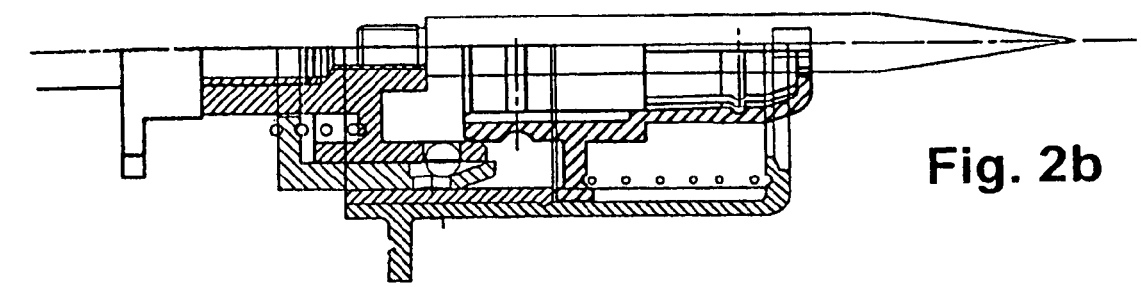
Figure 2A:
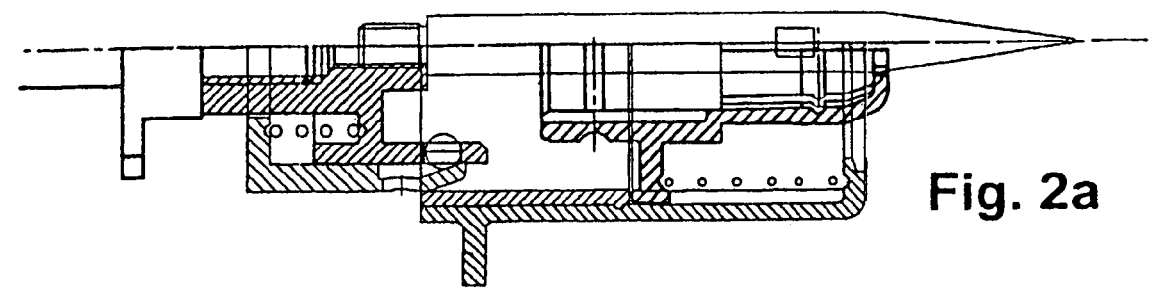

Referring again to the embodiment shown in FIG. 1 and 1a, also made integrally with the picking-up means 20 is a first male element 22 of the ball-type press-block coupling mentioned above; the female element of the ball-type press-block coupling is made instead on the bottom part of the intermediate element 11. The ball-type press-block coupling is completed by a tubular element 12 (FIG. 1) the bottom end of which has internally a re-entrant surface shaped like the frustum of a cone. Preferably—but not necessarily—three balls 23 are housed inside the through holes in the vertical wall of the intermediate element 11. The balls jam in an annular groove 30 (FIG. 1a) or in a series of recesses suitable to transfer the moment generated by the rotation, made on the male part of the press-block coupling. The balls 23 are pushed towards the inside by the re-entrant surface shaped like a truncated cone (or by another system based on an inclined plane) since the tubular element 12 is pushed upwards by a first spring 13. The picking-up means 20 can be rapidly slid out by pushing the tubular element 12 downwards.

The sequence of the fast-coupling operation of the picking-up means 20 on the device 1 of FIG. 1 is shown in FIGS. 2a–2e.

The chuck 20 in FIG. 1 are made hollow with an internal through hole through which an electrode 17 for electrostatic coating, the nozzle of a filler, or other elements which are to enter the bottle 2, can pass and come out.

The sliding sleeve is constantly pressed downwards by a second spring 14 compressed between a bottom internal projection of the sleeve and the sliding flange 11A with slotted edge, and it is prevented from sliding out by an annular plug 15, which is snap-fitted into the top part of the sliding sleeve 7 and which bears upon the slotted flange when the device 1 for picking up, handling and moving objects is not gripping any bottle 2 and is empty.

Figure 3B:
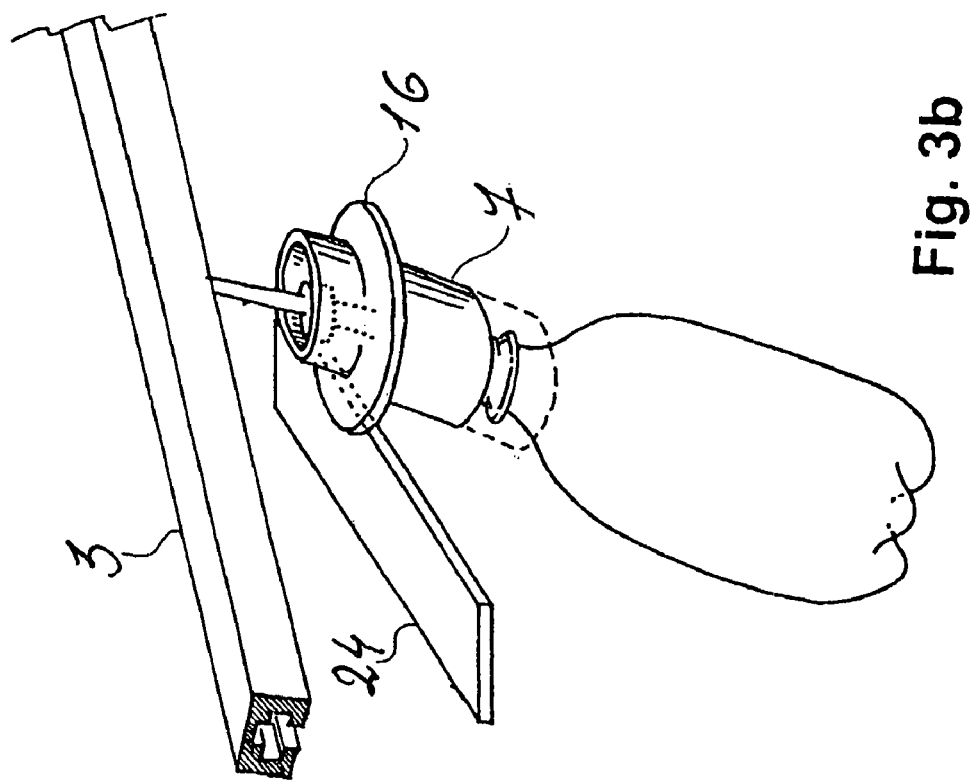
FIGS. 3a and 3b are schematic illustrations of two instants in the movement of raising of the sliding sleeve of the device of FIG. 1 by means of a cam-type system.
Figure 3A:
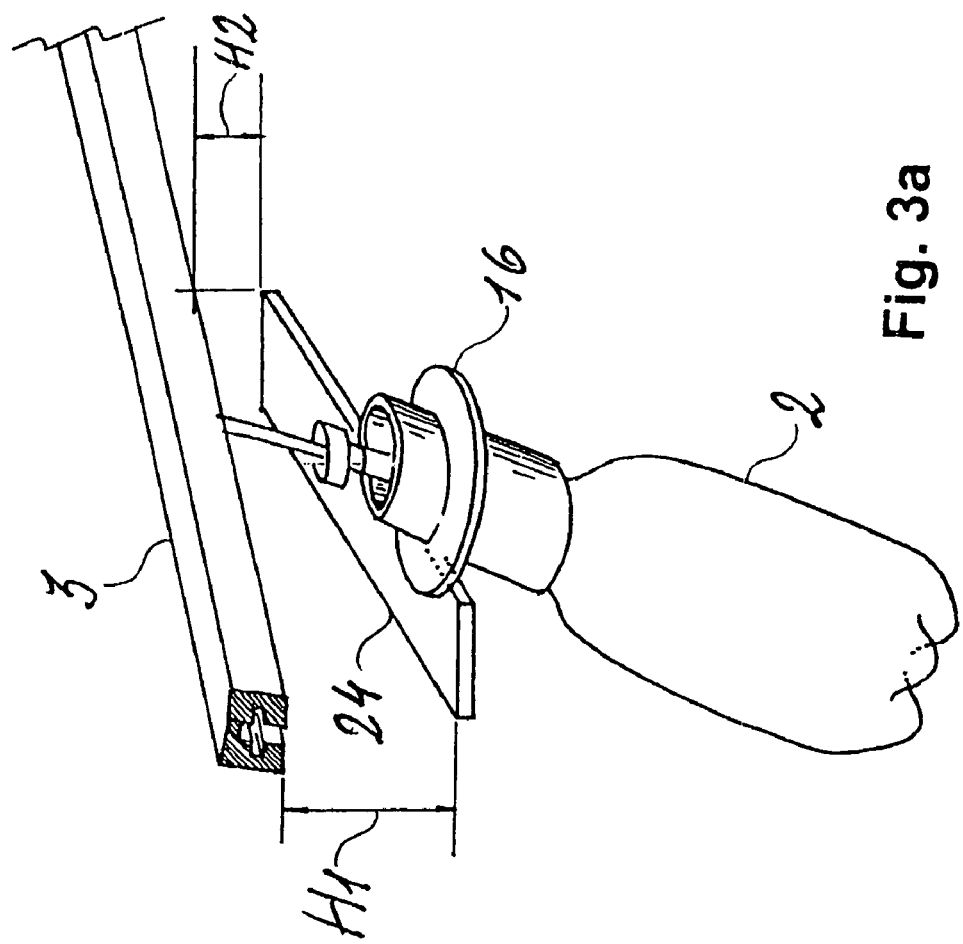

Raising of the sliding sleeve 7 can be controlled, for example, by a cam-type actuator made by providing on the sleeve a flange 16, which, during horizontal advance of the device 1, can be raised sliding on a pair of plane bars 24, which are also preferably made of technopolymers with an appropriate wear resistance and a low coefficient of sliding friction, for example, polyimide or polyphenyl resins, such as polyetherimide (PEI) or polyvinylidene fluoride (PVD), according to systems in themselves already known (FIGS. 3a and 3b). The bar 24 is inclined with respect to the horizontal, the rail 3 is horizontal, and H1 is greater than H2. When the conveyor advances, the flange 16 rests on the strip 24 and is pushed by the latter upwards (FIG. 3b).

If necessary, the surface 18 of the ring of the elastic prolongations 11B, which is the axial abutting end for the fitted bottle 2, is located lower down (FIG. 1a, height H) than the grooved flange 11A, so that the sliding sleeve 7, when it is raised, can conveniently uncover the entire neck and threaded part of the bottle.

Advantageously, both the sliding sleeve 7 and the bars 24—which are on the fixed supporting frame of the conveyor—of the cam-type actuation are made of appropriate technopolymers, which are sufficiently resistant to wear and which have low coefficients of sliding friction.

A device 1 for picking up, handling and moving objects, provided with the sliding sleeve 7, the annular plug 15 and the chuck 20 made of plastic material, can be injection-moulded at a low cost, has a very small weight and inertia, and the vibrations during a possible fast rotation of the bottle are such that the entire conveyor is subjected to less stress.

In addition, the above three plastic components, which in the device 1 are the ones most subject to wear during operation, can be quickly replaced in a single operation, thanks to the ball-type press-block coupling, during extraordinary maintenance. Since in a plant for the production of bottles by blow-moulding, the devices 1 for picking up, handling and moving objects frequently number some hundreds, if not thousands, the overall saving is all the more evident.

If appropriate technopolymers are chosen, these three plastic components will only need to be replaced once a year for reasons of wear and they will be able to stand up to the aggressive environments of present-day industrial processes.

Instead, the intermediate element 11 and the tubular element 12 are preferably made of metal.

There follows a description of the operation of the device of FIG. 1.

A bottle 2, or a generic container 2 having an open end 200 is pushed upwards against the ring of elastic extensions or prolongations 11B into a loading station, in a known way. The ring of prolongations is driven into the neck 200 of the bottle 2 and, by friction, blocks the bottle 2 axially as well as preventing it from rotating. The second spring 14 keeps the sliding sleeve 7 pressed so that the latter bears upon one part of the bottle (for example, the collar or the tear-seal flange—FIG. 5), in such a way as to isolate the neck 200 and obtain, as far as possible, a seal with respect to the outside environment, also depending upon the presence of other solution—if any—such as providing a seal on the annular ring of the sleeve which comes to bear upon the bottle 2. Clearly the shape, diameter, and travel of the sleeve 7 are designed according to the shape of the bottle or container and of the part of the bottle or container which the sleeve, when lowered, must isolate and protect from the outside environment.

In this way, the sliding sleeve 7 also constitutes an additional protection and isolation—in combination with the picking-up means 20, which might occasionally be faulty— of the internal cavity of the bottle 2 not only against paint and solvent, but also against other external contaminants, such as lubricants.

The bottle 2, produced, for instance, by blow-moulding, or by any other suitable technique, can thus be transported on an automatic conveyor 3 through the various processing stations downstream of the moulding station. In the case of a bottle made of PET, for example, the moulded bottle may pass through an HVLP spray-coating or electrostatic-coating station, for example for a colouring treatment or a treatment of impermeabilization to $CO_2$ or to molecular oxygen, as in the case of bottles for effervescent beverages, fruit juice or beer, or in any case beverages that are sensitive to attack by oxygen and to loss of $CO_2$, without the region covered by the sliding sleeve for instance, the region of the neck and of the thread of the bottle, getting coated.

During the spray-coating operation, frequently the bottle must undergo spinning, at a speed of some 300 to 1100 rpm., and this is done, for instance, as was mentioned previously, by causing the pinion gear 10 to engage with a second drive chain which slides in a direction opposite to the direction of advance of the chain conveyor 3.

Advantageously, along the zones of the conveyor 3 in a position corresponding to the second driving chains, the wheels 7A, 7B, 9A, 9B of the devices 1 are caused to slide within a precision-manufactured section bar 4, leaving an amount of play, between the wheels and the sectional strips 4, smaller than in the remaining stretches of the conveyor. This reduces the horizontal deflection of the device 1 under the thrust that the second drive chain exerts on the pinion gear 10.

Downstream of the coating station (or whenever it is necessary), as the conveyor 3 continues on its way, the sliding sleeve 7 is raised, for instance by means of a cam-type system (FIGS. 3a and 3b), thus uncovering the neck 200 and the threaded region of the bottle, which, since they have not been coated, can be gripped, for example with mechanical grippers or other devices, even when the coating has not yet dried, in order to unload the bottle from the chain conveyor.

Figure 4:
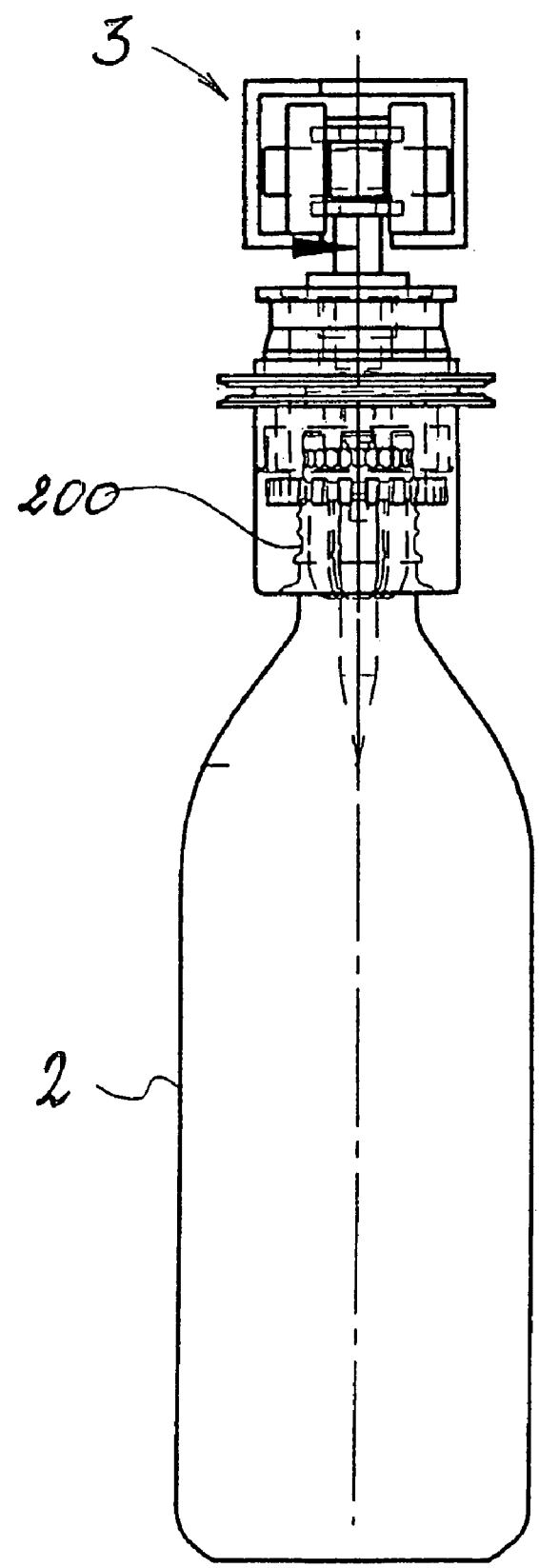
FIG. 4 is a schematic side view of a bottle fixed to a device for picking up, handling and moving objects, according to a second preferred embodiment of a device in accordance with the present invention.
Figure 5:
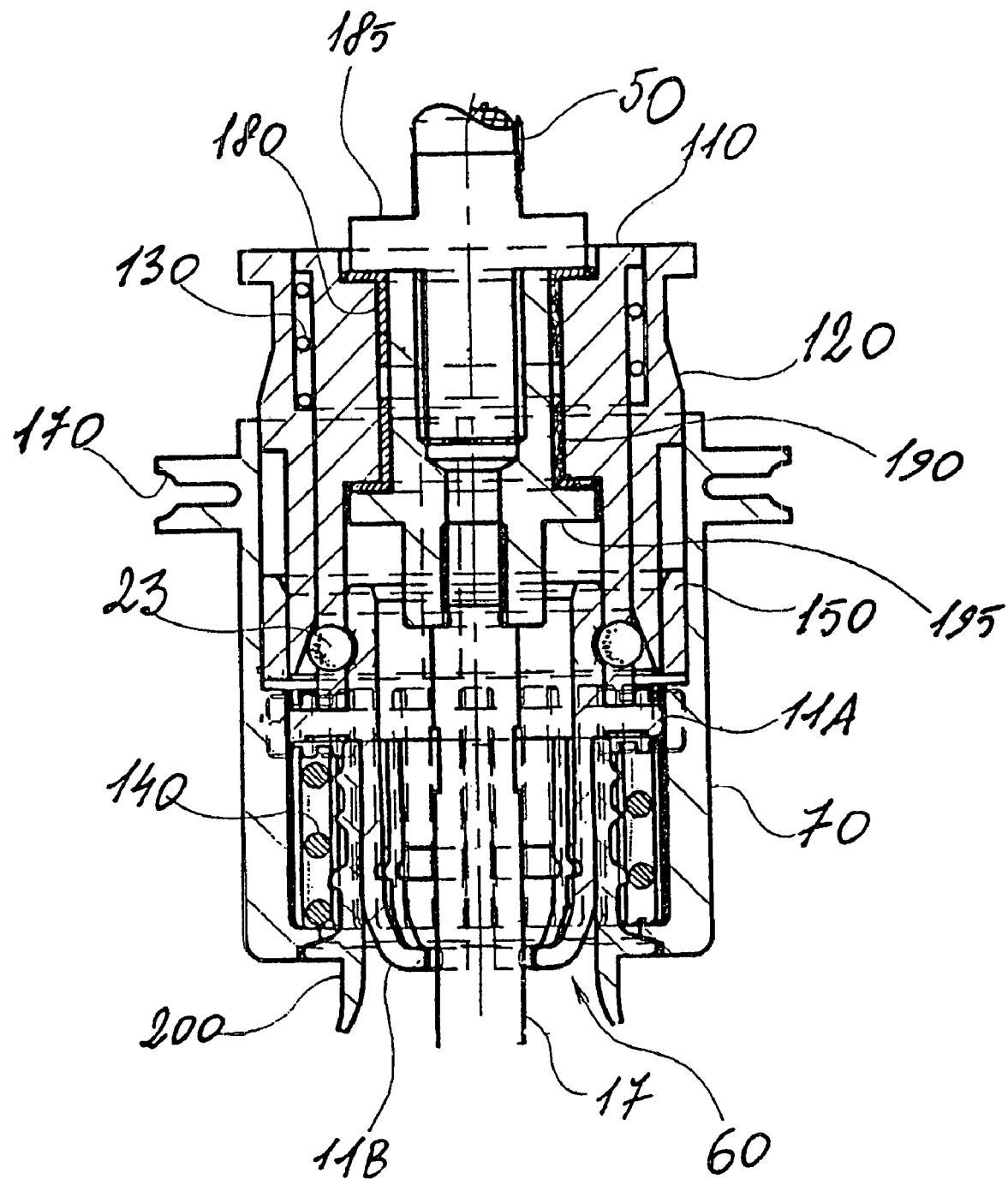
FIG. 5 is a schematic cross-sectional view of a detail of the device of FIG. 4 with a bottle inserted.

FIGS. 4 and 5 are schematic illustrations of a second preferred embodiment of a device for picking up, handling and moving objects according to the present invention, in which the sliding sleeve 70, the springs 140 and 130, the tubular element 120, the intermediate element 110, the picking-up means 60, and the annular plug 150 correspond to, and have similar modes of operation as, respectively, the items designated by 7, 14, 13, 12, 11, 20 and 15 of FIG. 1, previously described, whilst the shaft 50 for fixing to the conveying chain cannot rotate about its own axis, and the sleeve 70+picking-up means 60 system can rotate on a vertical axis thanks to the bushings 180 and 190 set between the intermediate element 110 and the two elements 185 and 195, which are fixed with respect to the shaft 50.

The sliding sleeve 70 can be set in rotation by a pulley, belt or cable which slides in a direction opposite to that of advance of the device 1 along the conveyor 3 and which grips inside the seat 170 made on the double flange similar to the flange 16 of FIGS. 3a and 3b. Also the double flange has the function of raising the sleeve 70 by means of an external-cam system 24, as illustrated in FIGS. 3a and 3b.

Figure 6:
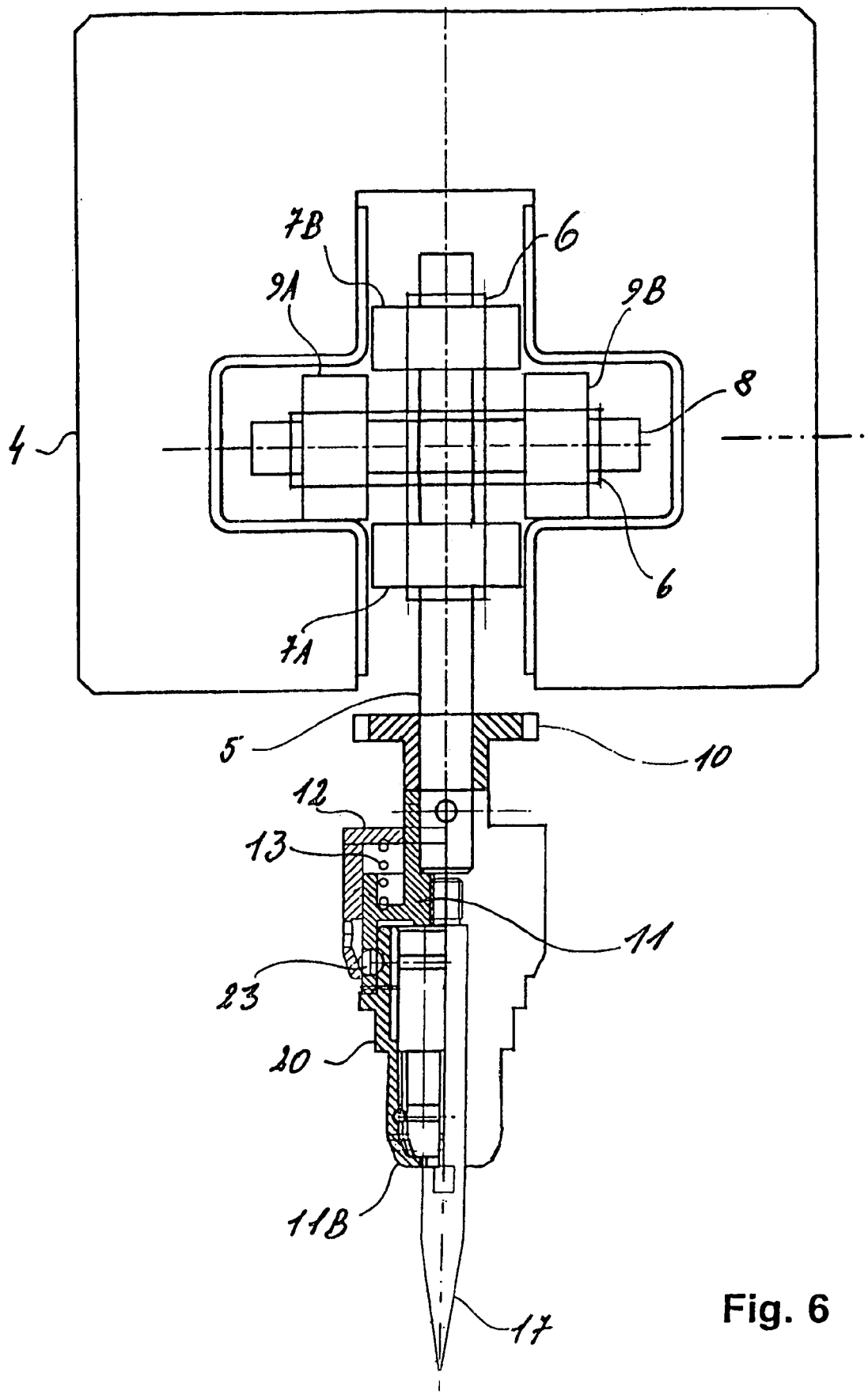
FIG. 6 is a schematic cross-sectional view according to a vertical plane of a device for picking up, handling and moving containers having at least one open end, according to an alternative embodiment of the present invention.

FIG. 6 shows another embodiment of a device for picking-up, handling and moving object according to the present invention: the device in FIG. 6 differs from the device in FIG. 1 in that the sliding sleeve 7 is not present, and chucks 20 are used, comprising the radially expandable ring of elastic or resilient extensions 11B, made preferably of an injectable technopolymer. Like in the embodiment of FIG. 1a, the ring of extensions 11B rests, in a position corresponding to an internal groove (FIG. 1a), on an annular spring 21 set inside the aforesaid ring and positioned roughly on a plane perpendicular to the longitudinal axis of the ring.

The thickness and shape of the elastic extensions are adapted to the container that has to be conveyed, in order to support it more or less rigidly according to the process specifications, for example, conveying speed, angular velocity, format of the container or preform, weight of the container or preform, design of the thread, temperature, etc. Some advantages of using this kind of picking-up means have already described previously; moreover, the ring of resilient prolongations is suitable to be easily produced by injection moulding of polymer materials with a relevant reduction of the cost of each device; the whole conception of the picking-up means with a ring of resilient prolongations resting on an elastic element is cheap and simple to be made.

The devices described above merely by way of example can clearly undergo numerous other variations without thereby departing from the scope of the present invention. For instance, it is possible to vary the type of fixing of the picking-up device 1 to the chain conveyor: the vertical shaft 5 may be either rotating or fixed, and may be positioned either in the vicinity of or at a distance from the wheels of the chain of the conveyor. Likewise, the device 1 for picking up, handling and moving objects can be used for handling an extremely wide range of objects, including semi-finished products, such as preforms or parisons for blow-moulding; the flange 16 can be modified and replaced by one or more segments of flange or by an appropriate radial projection of the sliding sleeve 7, designed to raise the latter, sliding on an external cam; the annular spring 21 can be replaced generally with other radially resilient elements; the first male element 22 (FIG. 1a) integral with the picking-up means 20 can also be a metal insert around which the plastic body of the picking-up means 20 are co-moulded; further modifications are anyway possible.

What is claimed is:

1. A device (1) for holding objects (2) having at least one open end (200), comprising picking-up means (20) suitable to grip and withhold the object from inside the open end (200), and comprising in addition a protective sliding sleeve (7, 70) suitable to cover and protect a pre-determined portion of the object (2) in the proximity of the open end (200), wherein the protective sleeve is slidable (7, 70) relative to picking-up means (20), wherein there are provided means (24) for sliding said protective sleeve (7, 70) between a first position in which said pre-determined portion of the object (2) in the proximity of the open end is not covered while being withheld and a second position in which said predetermined portion of the object (2) in the proximity of the open end is covered and vice versa while the object (2) is held by the picking-up means (20), and wherein there are provided first actuation means for said picking-up means (20), and second actuation means for said means (24) for sliding said protective sleeve wherein said first actuation means are actuatable independent from said second actuation means.

2. The device according to claim 1, wherein it further comprises a slide guide (11C) on which the sliding sleeve (7, 70) can slide, and with respect to which the picking-up means (20) occupy a fixed position.

3. The device according to claim 2, wherein the sliding sleeve (7, 70) comprises at least one radial projection (16) suitable to control the sliding of the sleeve (7, 70) with a cam-type actuation system (24).

4. The device according to claim 2, wherein the picking-up means (20) comprise on their outside a radially expandable ring of elastic and/or deformable prolongations (11B).

5. The device according to claim 4, wherein the elastic and/or deformable prolongations (11B) rest on a radially elastic element (21) which is inside the ring of elastic and/or deformable prolongations (11B) and which can be deformed radially with respect to the ring itself.

6. The device according to claim 1, wherein the picking-up means (20) comprise a first seat (22) of a press-block coupling for coupling the picking-up means (20) to the ensemble of the device (1).

7. The device according to claim 1, wherein there is further comprised a vertical connection element (5, 50) connected to one or more wheels or rollers (7A, 7B, 9A, 9B) suitable to slide on a supporting guide (4).

8. The device according to claim 1, wherein said picking-up means (20) are made of a mouldable plastic material.

9. The device according to claim 8, wherein said mouldable plastic material comprises polyvinylidene fluoride and/or other fluorine polymers and/or copolymers.

10. A method for handling and moving objects (2) having at least one open end (200), carried out by means of a device according to any of the claims 1 to 4, comprising the following steps:
    gripping and withholding the object (2) from inside the open end (200) with picking-up means (20) which further comprise a protective sliding sleeve (7) suitable to cover and protect a pre-determined portion of the object (2) in the proximity of the open end (200), where said picking-up means (20) is conveyed by an endless traction element conveyor (3) or endless load conveying surface conveyor;
    moving the object (2) withheld by the picking-up means (20) through a pre-determined succession of processing stations, protecting the pre-determined portion of the object (2) in the proximity of the open end (200) by covering it with the sliding sleeve (7);
    uncovering the pre-determined portion of the object (2) in the proximity of the open end (200), while maintaining the grip on the object from inside the open end (200) using the picking-up means (20);
    removing the object (2) from the picking-up means (20) by other picking-up means external and different to the picking-up means (20) and gripping the object from outside the open end (200) with mechanical grippers.

11. A device (1) for conveying objects (2) having at least one open end (200), comprising picking-up means (20) suitable to grip and withhold the object from inside the open end (200) and block it by friction, wherein the picking-up means (20) comprise on their outside a radially expandable ring of elastic and/or deformable prolongations (11B) which rest on a radially elastic element (21) which is inside the ring of elastic and/or deformable prolongations (11B) and which can be deformed radially with respect to the ring itself.

12. The device according to claim 11, wherein there are provided means for transmitting motion (10, 170), suitable to set in rotation the picking-up means (20), where the means for transmitting motion are one of the following devices: a pinion gear, a pulley drivable with a belt, and a friction wheel.

13. The device according to claim 12, wherein the picking-up means (20) comprise a first seat (22) of a press-block coupling for coupling the picking-up means (20) to the ensemble of the device (1).

14. The device according to claim 13, wherein there is provided an intermediate element (11, 110), in turn comprising the second seat for accommodating the press-block coupling (22) of the picking-up means (20), a substantially tubular element (12, 120) slidable about the intermediate element (11, 110) and pressed by a spring (13, 130), and comprising one or more inclined surfaces or inclined planes, suitable to compress the ball or balls (23) of the press-block coupling (22), and in that the sliding sleeve (7, 70) can slide on or about an external surface of the tubular element (12, 120).

15. The device according to claim 11, wherein there is further comprised a vertical connection element (5, 50) connected to one or more wheels or rollers (7A, 7B, 9A, 9B) suitable to slide on a supporting guide (4).

16. The device according to claim 15, wherein the vertical connection element (5, 50) consists substantially of a vertical connection shaft about which at least one pair of wheels or rollers (7A, 7B) rotates about a vertical axis.

17. The device according to claim 16, wherein the vertical connection shaft (5) can rotate, about a vertical axis, within a housing (6) on which the at least one pair of elements of wheels or rollers (7A, 7B) rotates coaxially to the shaft (5).

18. The device according to claim 11, wherein said picking-up means (20) are made of a mouldable plastic material.

19. The device according to claim 18, wherein said mouldable plastic material comprises polyvinylidene fluoride and/or other fluorine polymers and/or copolymers.

* * * * *